(12) United States Patent
Slevin et al.

(10) Patent No.: US 9,980,116 B2
(45) Date of Patent: May 22, 2018

(54) FACILITY COMMUNICATIONS INFRASTRUCTURE

(71) Applicant: The Detection Group, Inc., Sunnyvale, CA (US)

(72) Inventors: Richard S. Slevin, Los Altos Hills, CA (US); Steven Anderson, Setauket, NY (US); Teck Ee Loh, San Jose, CA (US); Glen Michael Paulus, Sunnyvale, CA (US)

(73) Assignee: THE DETECTION GROUP, INC., Sunnyvale, CA (US)

( * ) Notice: Subject to any disclaimer, the term of this patent is extended or adjusted under 35 U.S.C. 154(b) by 0 days. days.

(21) Appl. No.: 15/135,471

(22) Filed: Apr. 21, 2016

(65) Prior Publication Data

US 2016/0241988 A1   Aug. 18, 2016

Related U.S. Application Data

(63) Continuation-in-part of application No. 14/985,202, filed on Dec. 30, 2015.

(60) Provisional application No. 62/098,991, filed on Dec. 31, 2014.

(51) Int. Cl.
*G08B 29/00* (2006.01)
*H04W 4/00* (2018.01)
*H04Q 9/00* (2006.01)

(52) U.S. Cl.
CPC ............... *H04W 4/70* (2018.02); *H04Q 9/00* (2013.01); *H04W 4/005* (2013.01); *H04Q 2209/40* (2013.01)

(58) Field of Classification Search
CPC ...... H04W 4/005; H04Q 9/00; H04Q 2209/40
USPC ......... 340/506, 5.61, 585, 521, 286.02, 541, 340/870.11; 370/235, 311, 252, 329, 315, 370/328, 254, 408, 255, 253, 389; 455/426.1, 437, 456.1, 456.3, 575
See application file for complete search history.

(56) References Cited

U.S. PATENT DOCUMENTS

| | | | |
|---|---|---|---|
| 2007/0195808 A1* | 8/2007 | Ehrlich | H04L 45/04 370/408 |
| 2010/0238019 A1* | 9/2010 | Richman | G08B 13/19656 340/521 |
| 2012/0166610 A1* | 6/2012 | Doh | H04L 67/12 709/223 |
| 2013/0128786 A1* | 5/2013 | Sultan | H04W 52/0238 370/311 |
| 2013/0311140 A1* | 11/2013 | Schechter | H04L 67/34 702/188 |
| 2014/0075055 A1* | 3/2014 | Yi | G06F 11/3051 710/19 |

(Continued)

FOREIGN PATENT DOCUMENTS

WO    WO 2014061537 A1 *  4/2014  .......... H04W 72/121

*Primary Examiner* — Dhaval Patel
(74) *Attorney, Agent, or Firm* — Nath, Goldberg & Meyer; Jerald L. Meyer

(57) ABSTRACT

A system and method for improving upon limitations of conventional infrastructure communications systems. A sensor architecture may include a multiple protocol communications paradigm to enhance whole building sensor management. A system may have one or more innovations that include anticipatory alarms, nuisance alarm reduction, and big data building profiling.

16 Claims, 3 Drawing Sheets

(56) References Cited

U.S. PATENT DOCUMENTS

| | | | |
|---|---|---|---|
| 2014/0185503 A1* | 7/2014 | Roy | H04W 52/0216 370/311 |
| 2014/0269318 A1* | 9/2014 | Hasarchi | H04B 7/024 370/235 |
| 2014/0324615 A1* | 10/2014 | Kulkarni | G06Q 30/0601 705/26.1 |
| 2014/0354161 A1* | 12/2014 | Aggarwal | H05B 37/0245 315/153 |
| 2015/0237651 A1* | 8/2015 | Nobusawa | H04W 74/006 370/329 |

* cited by examiner

FACILITY COMMUNICATIONS INFRASTRUCTURE

CROSS REFERENCE TO RELATED APPLICATIONS

This application is a continuation-in-part of U.S. patent application Ser. No. 14/985,202 filed 30 Dec. 2015 which in turn claims benefit of U.S. Patent Application No. 62/098,991, the contents of these applications are hereby expressly incorporated in their entireties by reference thereto for all purposes.

FIELD OF THE INVENTION

The present invention relates generally to communications systems, and more specifically, but not exclusively, to facility communications infrastructure for enabling, supporting, and monitoring communications throughout a large multifloor building and between the building and outside services and facilities.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

U.S. Pat. No. 8,188,873 describes a water leak detection system, the contents of which are hereby expressly incorporated by reference thereto for all purposes. That leak system was designed to be a very robust system with redundant backups, insuring reliable reporting of leaks. The sensor/transmitter system contains multiple water sensors, wirelessly linked to base stations on each floor of a building. The base stations are independently linked by POTS phone line to a cloud server that interprets the call protocol and message. The server logs the call, both daily routine status messages, confirming the sensor is alive, plus battery condition. The server also logs that any alarm messages. Alarm messages are handled differently and are priority messages, resulting in email, text and voice messages to the appropriate person responsible for the specific building. These are also redundantly sent to additional persons in hierarchical sequence until the alarm is acknowledged. The base stations have a further redundancy, which is that each base station calls out individually to the responsible person for the building. These redundant features add to the reliability and hence the value of the system.

The system also includes an on-line password protected portal that shows status of each sensor in each building. Access is granted to customers for their buildings. The portal allows for a simple method to see an overview of an entire building's or property owner's building's sensors. Status currently includes battery status and communication verification as well as history of alarms. Messages are "pushed" weekly to building engineers for any required maintenance of the sensors.

The current system, although reliable, has some limitations for growth into the Internet of Things (IoT), and with over 16K sensors in the field, there are changes that improve upon the previously disclosed system. The current system may be limited in some instances, including: (1) limited wireless range (the wireless communications paradigm does not go through floors or within a floor at a distance greater than 300 feet) without the use of relatively expensive repeaters; (2) all sensors are transmit only and cannot receive messages (although not a major issue with most sensors, combined with a POTS line interface, requiring a phone call to be made to transmit to the server, timing of messages therefore can take several attempts to transmit); (3) base stations are required on every floor due to the range and limitations of the current electronics; (4) the number of sensors attached to each base station are limited; (5) base stations are hard wired to the POTS lines, requiring pulling phone lines in the riser, adding to installation costs; (6) the current electronics are expensive compared to current costs and can be substantially reduced using today's architecture and hardware; (7) the aesthetics of the current system would benefit from a dramatic design refresh; (8) although an operator can shut off service to the portal in case of non-payment by a customer, the base station redundancy allows base stations to still call the customer in case of an emergency; (9) the current alkaline batteries used in the systems, although power can last 5-7 years, many tend to leak after 3-4 years, necessitating replacement of not only the batteries, but the sensors itself due to acid damage; (10) installation and provisioning preferably require a fair degree of expertise and training for superior performance; (11) the current system is not capable of easily adding the next level of features cost effectively; (12) the existing system cannot receive signals from other IoT devices.

There are several general types of communications networks that individually or collectively fail to provide a building-wide architecture allowing arbitrarily large numbers of wireless, battery-operated sensors to communicate outside the building structure. Large commercial buildings increasingly are offered advantages for large numbers of sensors distributed throughout the building yet the existing architecture offerings have drawbacks that hinder adoption and use. Large commercial buildings have many floors and include reinforced concrete and steel structures between floors. Many of the buildings were constructed without an easy way to add wired risers to communicate between floors.

What is needed is a system and method for improving upon limitations of conventional infrastructure communications systems.

BRIEF SUMMARY OF THE INVENTION

Disclosed is a system and method for improving upon limitations of conventional infrastructure communications systems. The following summary of the invention is provided to facilitate an understanding of some of technical features related to infrastructure communications, and is not intended to be a full description of the present invention. A full appreciation of the various aspects of the invention can be gained by taking the entire specification, claims, drawings, and abstract as a whole. The present invention is applicable to other installations and uses in additions to facility communications infrastructure.

An embodiment of the present invention includes a system and method for a communications architecture appropriate for distribution of large numbers of wireless sensors throughout a large commercial building and may include as well a simple and efficient mechanism to communicate the sensor information off-site.

An embodiment of the present invention may include, in this context, a hybrid STAR/MESH configuration for wireless communication of large numbers of sensors distributed throughout many floors of a large commercial building (e.g., one such hub floor). A set of wireless sensors are configured to communicate with a central wireless router/hub (in a star configuration using a star communications protocol) and each wireless router/hub is part of a wireless mesh network that communicates with other wireless routers/hubs using mesh network protocols. In some embodiments a wireless sensor node may be configured to seek one or more alternative wireless hubs in case of a communications failure.

An embodiment of the present invention may allow for over 4.5 million sensor nodes throughout a multi-tiered building using a hybrid star/mesh architecture allowing each node to communicate once per hour (100 milliseconds/message) while allowing for a 50% open time, which is significantly more than either a star configuration or a mesh configuration alone. Different scheduling parameters may alter the available number of nodes.

An embodiment of the present invention for a hybrid star/mesh architecture includes dynamic timing allowing for adds and reductions in node count while maintaining desired gaps between each check-in of each node (a sensor "heartbeat"), and allowing for a sensor node to have a secondary/tertiary communication hub or use long range communications, which may allow for 1.5 million robust sensor nodes.

An embodiment of the present invention may include denser hubs/routers communicating to a shared base station. For example, in a hybrid star/mesh configuration having a base station communicating with many hubs (potentially several hundreds) from different areas, each hub communicating with potentially tens of thousands of wireless sensor/controllers, a limit to an expanse of the communications can be the density of information exchanged with the base station. Some embodiments may create precise time windows for various communications to lower a possibility for communications conflicts. Devices participating in this scheduling may have internal clocks and those clocks drift over time. Hubs are provided with auto-time scheduling between a hub and its sensors to resynchronize time with the sensors so that all the nodes are able to maintain a desired communications window, such as to maintain constant time intervals between sensor communications to allow for alarms and critical signals to pass through the system. The smart base station may perform a role of master scheduler for auto-status data transfer from all hubs to avoid traffic conflicts. For example, no service request is required for alarms either from a sensor or a hub. A smart base station may issue a request to transfer its information out from building to reduce/eliminate a need for additional communications security as the communication pass out through a firewall and is not in response to an incoming message that has to be authorized to interact through the firewall. Outbound communications from the base station may include instructions/advice for a remote cloud server to collect auto-status data at specified time frames or when a data transmit buffer is nearing capacity.

An embodiment of the present invention may allow for superior coverage of a building sensing volume using less hardware and providing improved battery life. For example, by configuring sensor nodes to communicate for very long range within a building using low frequency wireless signaling (e.g., 900 MHz) at about 1 Watt/30 dbm. Nominally power requirements for an extensive wireless communications system with these parameters could be very significant but some embodiments of the present invention may offer extremely low overall power budgets by scheduling transmissions from the sensors and having communications be as short as is necessary (e.g., a sensor wakes from sleep at a scheduled time, provides its data to its hub with a burst transmission, and the receives a confirmation from the hub with instructions for a next communication scheduled time, at which time the sensor enters sleep mode). Some embodiments may include a minimum ten year battery life for the sensors using 2 CR123A batteries on board. The long distance allows more distance than is possible with a mesh communications protocol and uses less hardware (which also results in lower maintenance) and meeting or improving upon battery life of much less capable systems.

Anticipatory algorithms—The concept is to use an algorithmic approach, combined with flow sensors, likely ultrasonic (non-intrusive) types, to characterize water and other liquid flows. Once characterized (by day, by hour, or the like.) embodiments of the present invention can analyze the data for trends and recognize situations that are uncharacteristic and warn the building engineer of a possible flow condition. This can happen inside or out, behind walls or even an internal leak in HVAC units. Other data can be coupled with this, like water meter output and possibly water sensor alarms.

False Alarm reduction—This is a bit of a monomer since a water alarm is seldom a false alarm, but more likely the alarm was caused by a janitor cleaning or other source of actual water in a non-leak situation. Characterizing these false alarms and grading them as to general authenticity along with looking at flows (detailed herein) allow embodiments of the system to separate a false alarm from a real leak and generate the right alarm, warning or alarm Eliminating nuisance alarms is a major step to differentiating these embodiments of the system from others.

Big Data—Acquiring data about the building can allow a perspective buyer, either of the building or a condo, to have peace of mind and possibly increase the real estate value. This is the "Building Facts" (as opposed to the "CarFax" now nearly required to sell any used car). If available, a buyer would want to know that a building has a history of leaks that displaced occupants for months during repairs, or other similar metrics. A seller offering a building with little if any of such characteristics, when objectively reported, offers a buyer a premium value. It also tells the buyer how well the building is maintained. In some instances this can be a real advantage to building owners. Some implementations may be part of a service where such data might be sold. This data, when available by the present system, also can be used to negotiate insurance rates.

Multiple protocol system—The new architecture allows some embodiments of the present invention to use virtually anyone's sensors with an installed system. Today, the standards for sensors include: Z-Wave, Wi-Fi, BTLE, ZigBee and some others, none of which can penetrate a commercial building floor to a floor immediately above or below, so cables need to be run (cost of a riser cable can be upwards of $50K). Some embodiments of the present system include wireless communications through floors allowing for no cabling, and thus likely to be the defacto low cost standard, provided other sensors may be accommodated. Base stations located on either every floor or ever other floor have multiple radio capability. This means that any sensor can talk to the base station, which then wraps the message in encrypted protocols and sends it wirelessly to the web. No other system does this today.

Another value add is that using other third-party sensors on our system allows the system to be the one portal controlling the entire building's sensor reporting and alarms. This can lead to several business models. For example: an operator can charge for the other sensors to use the system, or, the operator can buy any sensor and sell/license it to a customer, either way, opening up the utility of the system for anything from reporting energy usage, motion for security, opening door locks, or going outside for landscape controls. One system, one control portal, one alarm source. Simple and effective.

The new system preferably addresses the shortcomings of existing systems, including those described herein, while maintaining high information integrity level and redundant system approach, as well as expanding features as follows: (1) work with the legacy systems already installed and be able to expand them into the new features with minimal changes and costs; (2) installable and operate with minimal training (important for self-install implementations); (3) support the new features, including valve shutoff by individual location, by zone or by both predefined plumbing structures and based on predictive software; extending to linear sensors and other water sensors as needs arise; adding virtually any sensor type, like fire, moisture, and the like; control systems for valve and other controllable devices, including switchgear, lights, thermostats, sprinkler systems, etc.; talk to Building Management Systems (BMS), potentially bi-directionally; predictive analytics, like ultrasonically sensing pipe flow characteristics over time and creating an automated control response to certain aberrations consistent with a leak that might not yet be physically detected; base stations capable of communicating with and controlling virtually any sensor and/or control; the system needs to allow for communications with other IoT based devices protocols when such protocols become standard, which may take several years before that standard is resolved; agnostic for any radio, for example a wireless radiofrequency communications model to be based on longer range 900 MHz transceivers, but also allow for Wi-Fi, Z-Wave, and other standards within the hardware and software architecture.

A sensor architecture for a first multi-room building including a first plurality of sensors distributed within the first multi-room building, including a first sensor subset of the first plurality of sensors distributed in a first area of the first multi-room building; a second sensor subset of the first plurality of sensors distributed in a second area of the first multi-room building; a first repeater coupled to the first sensor subset; a second repeater coupled to the second sensor subset; and a first super base station coupled to the first repeater and to the second repeater; wherein each the repeater includes a first communication protocol for communications with its associated sensor subset; and wherein each the repeater includes a second communication protocol, different from the first communication protocol, for communications with the super base station.

Some embodiments may include a controller, either as part of the super base station, a monitoring station within the building or another building, or part of an extra-building management portal accessing information from super base stations in multiple geographically distributed buildings. The controller may include a processor, for example a stored program computing system, that accesses executable instructions from a memory to perform a range of data collection and management in addition to traditional monitoring and alarm triggering. These management functions may include anticipatory alarms indicating a condition that could lead to an actual alarm, nuisance alarm reduction, and/or big data collection and analysis to provide a building health report based upon a location and frequency of alarm triggers.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
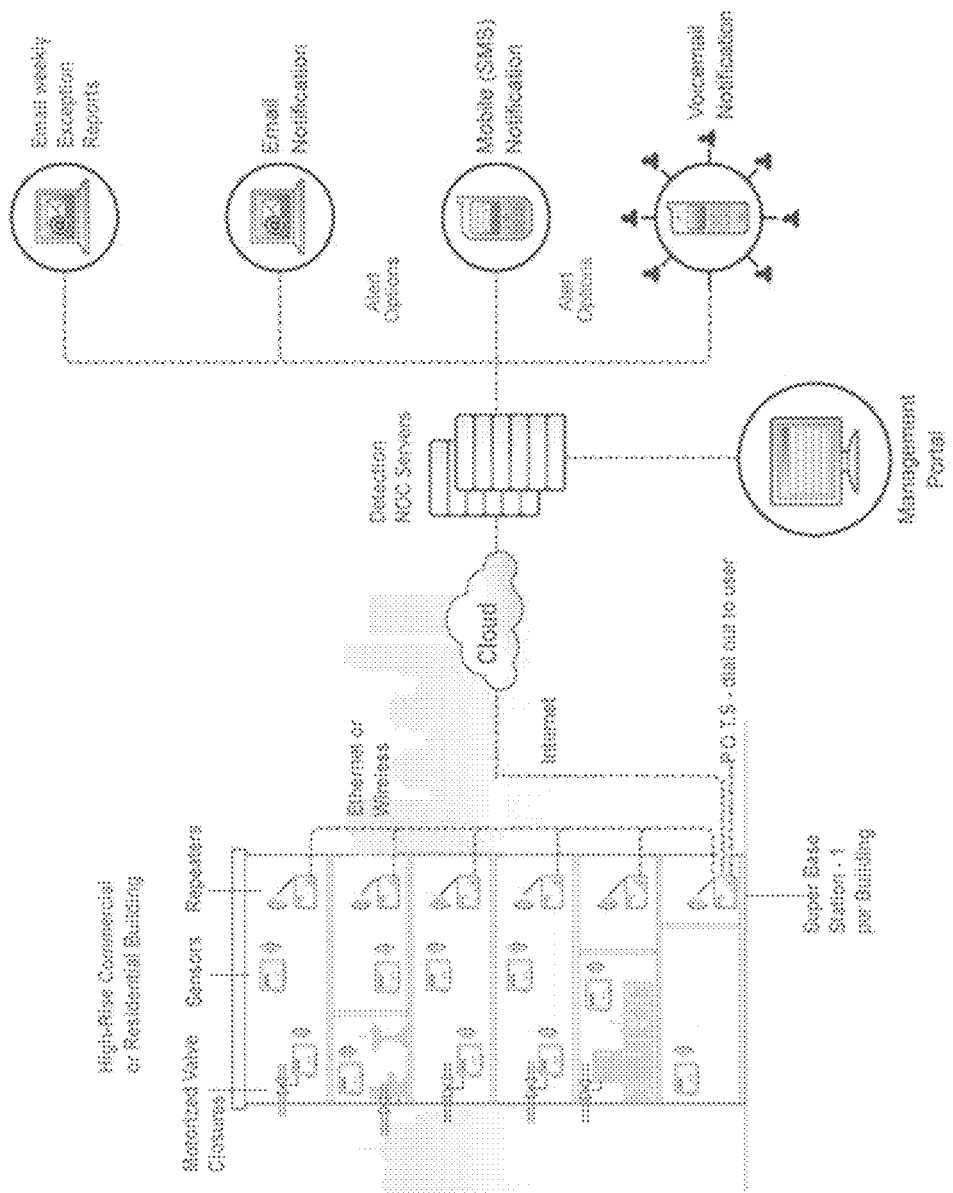
FIG. 1 illustrates a representative schematic of a building deployed new architecture for a communications infrastructure.

Embodiments of the present invention provide a system and method for improving upon limitations of conventional infrastructure communications systems. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "mesh network" refers to a wireless ad hoc network in which communications are networked using multiple radio nodes organized in a mesh topology. While conventionally a mesh network includes mesh clients such as laptops, cell phones and other end-point wireless devices, as used herein mesh clients are routers employing an alternate communications mode, such as a star topology including wireless end-point devices such as sensors that communicate with a star router that is also the mesh client. Mesh network as used herein includes mesh routers communicating with the star router clients and may include a mesh gateway to connect to the Internet or other communications network (wired or wireless) outside of the space covered by the mesh routers. Each mesh router relays data for the entire mesh network which includes communications to and from individual nodes coupled to a star router.

As used herein, the term "star topology" refers to a local area communications network of communication devices, each device individually coupled, wired or wirelessly, to a single star router. These devices may include sensors individually communicated to a star router.

As used herein, the term "hybrid mesh network" refers to a communications architecture in which individual communications nodes, such as sensors, are coupled to one of several star routers distributed throughout the service volume. These star routers in turn operate as mesh clients that communicate with a set of mesh routers also distributed throughout the service volume. One or mesh gateways may provide a communications mode outside the service volume.

FIG. 1 illustrates a representative schematic of a building deployed new architecture for a communications infrastructure.

The portal should be able to not only receive data from operator devices and control those devices, but also be usable as a platform for other building sensors and controls and talk to BMS systems.

Portal has push messages currently, but can be expanded. Some potential areas include: allowance for 3D visualization of location of devices; a preference to allow for larger data analytics, data gathering and processing from all sensors and develop patterns for predicting potential losses and controlling expenses from power, water, and the like; an advantage to a change over to a "Plivo" type front end system, allowing for legacy phone calls from the current system as well as internet based interface required for our new platform. A "Plivo" type system may allow for reliable PSTN connections to the server with minimal emulation. In addition, the "Plivo" type system allows for a new system to call into the server using the POTS service as a redundant backup to the ISP; Basic database type sorts would be available and customizable by the customers, so they can look at their buildings and sort on server key indices, like all low battery indication on a floor of a building, or lost communications within a building or historically looking at all leak alarms sorted by CBRE or Irvine buildings, for instance.

Description of Components

Sensors: Types—Two Versions, Passive and Active—

Passive sensors—These send data only—these are passive devices and the least expensive. They can be used as water sensors or with any other sensing device, like smoke, temperature, motion, moisture, oil, etc. sensor. They could work similarly to current devices and include sending info passively only, and used where the lowest cost sensors are required or desired. They will report battery status as well through the portal.

Active devices with bi-directional communications—These devices employ a transceiver allowing for sending information, as in the passive sensors, but also allow for receiving instructions. These have two main functions; 1. They can be deployed to act as controllers for servo mechanical systems, like valve shut off or opening, adjusting temperatures or lighting, etc.; and 2. They are used to pass on information from one transceiver to another, as in a repeater or mesh network. These are deployed between floors to wirelessly pass on information to the next floor without the use of expensive wiring in a building. They can also be used to cover long distances, like in a landscaping watering system.

Radios

The radio deployed in the new system has several requirements: preferably are low cost and easily available; able to transmit through building floors and long distances within the same floor; a preference to be secure, meaning minimally hackable; an ability to allow for mesh functionality; and minimal data collisions.

In addition, embodiments of the systems preferably allow for Mixed Systems Interface (MSI™). The system is radio agnostic, meaning it can use multiple radios on a single platform, sensor, repeater or super base station, so that it can communicate from and to both operator installed devices as well as any other wireless device, including current 316 MHz devices, and new 900 MHz and others, like Wi-Fi, Z-Wave, etc., devices. The system can, as an example, use a Wi-Fi radio in one of the repeaters as well as a 900 MHz device and a 316 MHz device and take information from an existing sensor, a new sensor or any Wi-Fi sensor. That data is then transmitted via the repeaters to the super base station and to the Cloud portal. In turn, the portal can see and send messages back to any of these devices.

Super Base Station

This device is used as the main communication device for all outside the building communications. It functions as a repository of data coming from the building's sensors and it also sends control and inquiry messages from the portal to the sensors. It can communicate via the wired Internet, cell modem or hard wired PSTN line. This is a redundant system. The Super Base Station's programming allows for normal bi-directional data flow between the building and the Portal. In case of any ISP outage, the system responds by the backup PSTN to call the portal, or can be programmed to direct call the responsible list for that building in case of an alarm. A third option to the PSTN is a built in cell modem (including battery power backup), capable of the same features as the PSTN hard line.

Detailed Specifications

| Description |
| --- |
| Sensors |
| Must have the ability to be built to send and/or receive |
| Must have 5+ year battery life |
| Must be able to directly control at least 2 valves |
| Must have the ability to add 4 individual sensors |
| Must have the ability to slot in up to 3 different radios |
| Casing must look slick and fit into high end buildings |
| Must have movement alarm in case it is moved. |
| Must have ability to verify it's in the right location (holster) |
| Must be able to be "pinged" |
| Must report low bat |
| Must have redundant transmission and verifications or messages sent |
| Must be easily provisioned by unskilled person |
| Can control multiple devices, valves motors, switches |
| Can communicate with BMS via UART/Backnet protocols |
| Must be low cost |
| Battery to be LiMgO2 chemistry of non-leakage |
| FCC certified |
| IP55 compliant |
| Added requirements for Repeater Sensors and operational valve and control sensors: |
| Hard wired 120 VAC power adapter with UL cert |
| Rechargeable battery backup |
| Super Base Station |
| 1 Gbit Ethernet router stack |
| PSTN capable |
| Cell modem optional |
| 900 MHz Radio module |

-continued

| Description |
| --- |
| ARM or Cortex M processor |
| 2 Optional radio slot/s |
| FCC Compliant |
| AC powered with Battery backup |
| Portal - Cloud based |
| Interface with PSTN, VoIP and ISP |
| Redundant Cloud servers, not limited by hardware, multiple locations |
| Can expand easily to multi-servers |
| Current services plus: |
| Alarm Response time with multiple alarms <2 seconds |
| Linux based SW |
| Custom Portal GUI by company/by user |
| On line query |
| 5 level hierarchical Password security |
| User Programmable push messages |
| Auto recurring billing system |

Given that many companies in the home market are using Wi-Fi, advantages of the use of the present 900 MHz radios include There are several compelling reasons for first not using Wi-Fi as the predominate RF and reasons why 900 MHz is preferred in this application.

Challenges to the Use of Wi-Fi—

First some background on why and where Wi-Fi is used today. Wi-Fi is generally a good choice for the backbone for home automation due to its ubiquitous nature of installed base, its general reliability and ease of use, but also for its distance coverage in a typical home. Wi-Fi is rather expensive to add to nodes today, but the cost is coming down. For today's home solution, Wi-Fi plus a lesser distance RF, like Z-Wave or ZigBee are good partners to get low cost and good coverage in the home and be able to talk to devices like lights and thermostats. Those are the good points and Wi-Fi is great in those applications. There are some limit even in single family homes. Wi-Fi widely publishes 100M distance, and in the right conditions, with line of sight, it may actually do that, but at a significantly reduced speed. Since most homes are not 100M long this seldom creates much of a problem. However, inside a home with typical sheetrock walls Wi-Fi range is limited to maybe 60-80 feet and speed drops off rapidly as distance increases. Obstacles play a significant role is reducing distance and speed. Wi-Fi in the home can penetrate wood framed floors, but distance is severely reduced. Home repeaters can be employed that adequately do the job of getting good coverage in a typical home, but add to the complexity and reduce system reliability. But on the whole, Wi-Fi is the best choice for the home today.

Now for the drawbacks. As mentioned above, Wi-Fi begins to provide significant performance degradation when there are obstacles typical in a large multi-story building for businesses and/or many residents. Most Wi-Fi is limited to 100 mW transmitters as are the devices talking to the Wi-Fi network, like a laptop or tablet. In a building, there are typically larger distances on a floor than in a home, and, materials of construction are different. Floors are typically rebar reinforced concrete and walls can be concrete or metal beamed construction. Wi-Fi cannot penetrate re-enforced concrete, so Wi-Fi cannot be used between floors in virtually any modern building, and thus such systems are not considered as viable options. Add the typical distances required to cover a commercial building and Wi-Fi is just not a good option. To use Wi-Fi, one would need to run Ethernet wiring to every floor through the riser, deploy either multiple routers or a router and multiple repeaters on each floor. Or, use the existing Wi-Fi infrastructure in most buildings. That alternative seems to be blocked by most building managers since that is a private network and requires opening up the building security, which is not a currently viable solution.

Advantages to 900 MHz—

Due to the lower frequency, 900 MHz can more easily penetrate walls and floors. In qualification testing at 100 mW some representative systems were able to achieve multiple floor communications and end to end communications in large buildings without the use of repeaters. This drops the installed cost dramatically, eliminating the riser run of wiring and expensive repeater as well as simplifying the installation and provisioning process while making the system more reliable due to less components. Add to that lower cost of the transceivers at typically under $2 in volume and there is a very compelling reason to use a frequency in this range. As a long term roadmap this frequency is used very commonly in long distance signal transmittals since the FCC allows for a full 1 Watt output in this range, allowing for multi-mile transmittals. For future products, like outdoor landscaping or building to building communications, this technology is the best choice today.

In context of data transmittance, a protocol is a format of a message. It is how another device receiving that message knows how to read it. In the context of some embodiments of the present invention, the protocol allows the system to read messages sent from operator proprietary sensors to operator's server. All data communications uses protocols. In the smart building area, and IoT devices, there are no official standards yet. There are many companies proposing and using their own protocols. But, it is likely going to be years before a standard is established. Why it is important to someone in this context is that the new system will allow the operator to talk to virtually any device so long as that device uses a known protocol that is programmed into the system. So it can read messages coming from a Wi-Fi input or a Z-Wave device or a cell modem, as long as the system has an ability to receive the message, which is possible simply by having the correct radio on board, and the protocol format, a flexibility designed into the system and architecture. This makes the present system compatible with all other systems, and allows it to communicate from, and to, virtually any wireless device. The operator can therefore be the backbone for reporting and control of all IoT devices within a building.

Anticipatory Algorithms—Using data from multiple sensors, for example:

1. The system may monitor behind wall humidity. When the system receives a spike in readings that are not normal for the season or location, the system may be enabled to raise a warning of a possible, otherwise undetectable, leak.

2. The system may monitor pipe flows based on time of day, day of the week, and/or time of year and determine patterns of use as a baseline pattern. Once established, detection of a flow state that is outside of the pattern (e.g., that is not normal or is otherwise exceptional as compared to the baseline pattern) can be automatically alarmed or a warning/alert issued identifying a possible leak. Anticipated or known/project fluctuations from the baseline may be included to limit warnings or alerts so that only abnormal/unanticipated pattern variations are flagged.

3. The system may monitor HVAC, lights and other occupancy devices to determine when there are persons in the area. When water, or other monitored resource is being used uncharacteristically at, for instance nighttime when no one is present, a warning can be issued.

False Alarm Reduction—Most of the false alarms are not false, when a leak detector is triggered for example, there typically is water present. However the water may be present from a non-leak source, like janitorial servicing of bathrooms, and thus not an actual leak. This then would be considered a nuisance alarm, and not strictly a false alarm.

1. The system may collect data daily and analyze patterns to determine times of cleaning as an example. For instance, when the system determines an alarm happens at 9 pm every Tuesday in the men's bathroom, but there is no leak, at some point the system "downgrades" the message and may issue a warning rather than a higher urgency alert. Or, when the system monitors flow in an area, such as the bathroom, the system may sense a discrete on and off pattern to water flow, and therefore the system is able to conclude there is an intended use, but not a leak, in that monitored area. Other rooms nearby (e.g., adjacent rooms in three dimensional space) could also be considered including any rooms in an upper floor that might leak through. Additional sensors might also be placed in that area to insure a positive leak is detected by using more than one sensor triggering an actual alarm. Through the use of data collected, the system can virtually eliminate such nuisance alarms.

2. In some cases, the system may provide a feature that gives the janitor perhaps 30 minutes alarm muting in the area to complete the work. This feature may be applied to other nuisance alarms that can be "false" in the sense that while the actual event was sensed and noted, other state conditions are applied before determining whether the sensed event is an actual emergency or some other intended or managed/controlled use of a monitored resource.

Big Data—The Building CarFax

1. Big data allows the system to perform a holistic building overview and create a building profile that the owner or perspective buyer may use to review the building history and see how well the building was maintained. A well maintained building has more value. From an occupancy standpoint, if, for instance, there is a leak, the floor or multiple floors are unusable for some period of time, therefore not collecting rent and displacing the occupants, both are extremely costly to the building owner and the renter. When that happens often, the renters may leave. Building value suffers. The system may generate a history log of leaks, humidity behind walls, and other sensed events, including nuisance alarms and other characterizations into this profile, for a perspective buyer. This information can be sold to our customers when they are looking to sell a building.

2. Big data can also be used for other potential benefits based on the above nuisance alarm mitigation, and pinpointing of problems before they occur, like a slow leak behind a wall being picked up by humidity sensors and flow anomalies.

Multi-Protocol Systems—An embodiment of the system may employ special protocols using a 928 MHz backbone within the buildings. The system may include routers placed strategically on every floor or every other floor to carry data from sensors on each floor to a base station and out to a cloud portal. To each of the routers the system may add any radio type to communicate with virtually any sensor produced today. The system may then carry that signal data to our cloud or send to any cloud based system worldwide. An advantage that some systems have that the system may take the signal from the sensor into a router via the same frequency and protocol radio as the sensor (for instance is the sensor is ZigBee, they system may add the ZigBee radio to the router and pull in the signal data via that radio). Once the system has the data, the system encapsulates that information in our 928 MHz protocol (the protocol provides an electronic wrapper or package carrying the original message in its native protocol) and send the encapsulated message down the systems floor to floor 928 MHz backbone to the base station, where it is then sent either to our cloud portal and decoded, or sent to another cloud. The original message need not be decoded by the system and allows for the original message to be communicated throughout, and outside, the building. An advantage to the building owner is that any sensor or set of sensors may be deployed without adding to the infrastructure of the building once the system architecture is in place to perform encapsulation and relay functions. A possible advantage to an operator of the backbone is the operator can deploy other sensors from other manufacturers without having to build and qualify them. Also the operator may monetize the backbone by providing inter-building and intra-building "message" messaging service to other makers of sensors and controllers.

Figure 2:
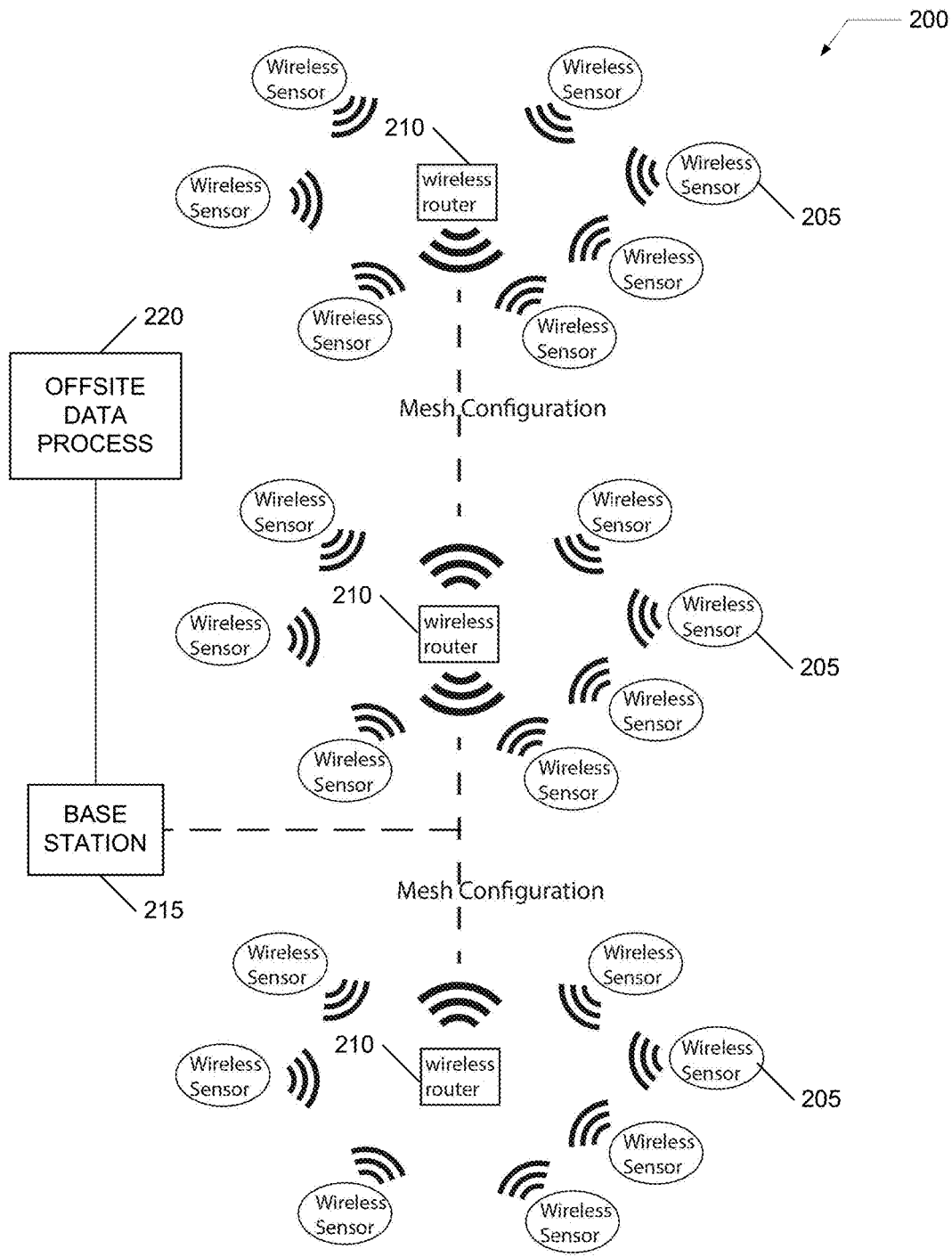
FIG. 2 illustrates a hybrid communications architecture.

FIG. 2 illustrates a hybrid communications architecture 200, such as may be installed within the commercial building illustrated in FIG. 1. Architecture 200 includes a hybrid star/mesh communications model in which a plurality of wireless sensors 205 use a wireless star communications protocol to exchange data with a particular wireless router 210 of a collection of wireless routers. Wireless routers 210 communicate with each other and with a base station 215 using a wireless mesh communications protocol. Base station 215 may communicate with one or more services illustrated generically as off-site processes 220. Communication with processes 220 may include a variety of wired and wireless protocols including one or more protocol stacks such as, for example, POTS, WIFI/WIMAX Protocols, Bluetooth protocol, Fiber Channel network protocols, Internet Protocol Suite or TCP/IP model or TCP/IP stack, OSI protocols family of information exchange standards developed jointly by the ISO and the ITU-T, and/or various Routing protocols.

In one embodiment, one or more wireless routers 210 are disposed on each serviced floor of the commercial building. Each wireless router 210 is associated with a set of wireless sensors 205 (which in some cases may include one or more controllers such as valve controllers and the like) are distributed throughout the floor). Wireless sensors 205 of a set are configured to communicate wirelessly with its associated router 210 using a STAR communications protocol. In some cases it may be desirable that a wireless sensor 205 have an ability for redundancy by being in communication with a secondary or tertiary router 210.

Each router 210 in turn communicates with other routers 210 using a wireless mesh protocol. Base station 215 may coordinate communications (e.g., a coordinator) for processes 220, routers 210, and/or sensors 205. As further described below, communications in architecture 200 may be scheduled precisely to improve capacity/density, that scheduling may be implemented by base station 215.

Regarding a density of sensor/control nodes in architecture 200, a typical ZigBee wireless mesh installation is practically limited to 200-400 nodes despite a theoretical upper limit of 65K such nodes made by the technology capability. Thus a sensor at each node provides 200-400 sensors which is inadequate for adequate coverage in the commercial building environment. Even with scheduling, a standard MESH implementation has issues which limit the maximum number of nodes in a system. The total number of nodes in a system is limited based on the required time to communicate between nodes, and the fact that each node must be on and available in the typical MESH network to always receive communications from any other node. This also has implications for power, which needs to be on continuously in this type of system. Due to the typically very short range of the ZigBee protocol, power requirements are low, but taken as power over the distance needed to transmit information, node to node, the power should be measured over the distance it needs to travel. So to get an accurate measure of the power MESH ZigBee requires to transmit over a distance, one sums the power of all the nodes required to transmit the distance. ZigBee MESH also requires many hardware nodes to move information, due to the short range and higher frequency, which takes more power to transmit over the same distance as a lower frequency device.

In contrast, architecture 200 allows for many more nodes (e.g., wireless sensors 205) due to the hybrid STAR/MESH configuration. For example, each floor in the building has one hub or router 210 that communicates with each and every node 205 on that floor on a dynamic sequential schedule. The schedule used is initially set at 50% open time (no communications scheduled) allowing for alarms to be sent from a node 205, limiting conflicts and collisions. Transmissions from each node or sensor 205 takes approximately 100 milliseconds. There are 3.6 million microseconds in an hour. When nodes 205 report in hourly, and system 200 allows for 50% open time, this translates to 18K nodes 205 per router 210. This is a much greater number than any exclusively MESH network can handle.

Routers 210 communicate using a wireless mesh protocol and therefore a router corresponds to a MESH node, and since MESH networks are practically limited to 200-400 mesh nodes, a total number of nodes 200 in hybrid system 200 is calculated to be 400×18K or about 7.2 million. However, system 200 further practically reduces a maximum number of routers 210 to a calculated number of 256 due to a practical data limit aggregating at base station 215. The 256 number is limited by the amount of data flowing through system 200 from all the nodes 205, as each successive lower floor adds to the data flow, accumulating more and more information as the information flows to base station 215 which may be thought of as present at a bottom floor. In this context, including schedule arrangement, a realistic number of practical, real world nodes 205 in system 200, is 256×18K, or 4.6 million nodes 205. Far more than any MESH alone or Star configuration alone is able to accommodate.

In some implementations of system 200, some embodiments may offer an advantage through a particular implementation of system timing which is can be important to a successful methodology useful for large commercial buildings and spaces/volumes. Dynamic timing allows for adds and reductions in nodes 205 while maintaining a desired signaling gap between each check-in of each node 205 (their heartbeat). This also allows system 200 to optionally employ secondary and tertiary hubs 210 each sensor 205 that sensor 205 might contact in case of a failure of a primary router 210 for any particular sensor 205. Similarly, a case of system 200 using long range wireless communications protocol for sensors 205, it can be more common for an obstruction leading to any particular sensor 205 dropping its connection to its primary hub 210 (and thus communicate through a backup router 210). In the case of a typically deployed system in a building, the secondary and tertiary wireless connections reduce the number of nodes 205 by 3× or a total of 4.6 million/3 or about 1.536 million nodes 205 with double backup routes. Further, some embodiments of system 200 may allow for several channels per floor (a channel identified by a router) that may allow an implementation of a system 200 to increase a density of communications in an area (e.g., multiple routers on a single floor) while avoiding interference from other competing signals operating with other routers 210, and other communication devices not part of system 200.

System 200 may thus include dynamic timing with a configurable hybrid structure that allows for 1.5 million sensor nodes 205 in a building while providing robustness through double backup communications channels.

System 200 may configure sensors 205 for very long range within the building. Typically this would be long range in an environment obstructed by metal, concrete and other obstacles and may preferentially choose a lowest frequency and a highest power allowable by rules such as those regulated by the Federal Communications Commission (FCC). For example, system 200 may employ star protocol communications in the 900 MHz region and are near a maximum allowable power limit of 1 Watt or 30 dbm. Power requirements to transmit from all nodes 200 at that level are large, but system 200 can offer an overall low power budget. This may be accomplished by scheduling transmissions for routine communications and making each transmission as short as possible. For example, communications from any particular node may follow a schedule (starting from node 205 in a sleep node that wakes according to a scheduled time slot): when waking, node 205 issues a burst transmission, receives a confirmation message from its hub 210 with instructions for the next communication scheduled time slot for sensor 205, then sensor 205 returns to sleep mode). Exceptional communications events, for example alarms or critical event messages, are not required to be constrained to this schedule established for routine messaging.

System 200 may include a projection of a 10 year plus battery life for each sensor 205, with 2 CR123A batteries powering the wireless communications with its router 210. This methodology, frequency, and burst power mode not only allow some systems 200 to operate with decreased power requirements for sensors 205, some embodiments for system 200 may also require less hardware than any MESH network, which in turn requires much less maintenance, while preserving or improving the battery life over more conventional systems that may offer decreased performance metrics and fewer available nodes.

There are many possible operational advantages for various embodiments of the present invention, including for example a method to reduce traffic on the hubs/routers 210 that might enable more hubs 210 (and therefore more nodes 205) in system 210.

In some instances, system 200 may include the following configuration and methodology to reduce network traffic:

1. System 200 components—system 200 includes smart base station 215 (e.g., a coordinator for a conventional ZigBee network), multiple hubs 210 (e.g., routers in a ZigBee network) and Sensor/Valve controller nodes 205 (e.g., end points in a ZigBee network).

2. System 200 implements auto time scheduling between hubs 210 and its set of sensors/valve controller nodes—auto time scheduling is implemented since a clock of various microcontrollers (uC) of devices of system 200 will drift. After a time, each hub 210 has to resynchronize the time with its sensors 205 to maintain a constant time interval between transmissions from nodes 205 allowing alarms, critical signals, and desired messaging to pass through with minimal conflict with communications from the potentially large numbers of nodes 205.

3. Smart base station 215 may act as a master scheduling for an auto status data transfer from all hubs 210 to avoid traffic conflicts (e.g., communications from hubs 210 is scheduled). No service request is required for alarms/critical messaging either from sensors 205 or router 210.

4. Off-site processes 220 may include a remote cloud server to aid in managing messages and communications with respect to system 200. System 200 may include requests to send information from smart base station 215 to the cloud server which may eliminate a need for special firewall considerations to communicate with the cloud server. (It is common for a commercial building to include various security measures for communications into a building network and those measures often include a hardware firewall that would need special configuration (which can be difficult to obtain) for an external service 220 to access system 200—however a device inside a secured network may often be allowed to establish a communications channel through the security to an outside device without special consideration and smart base station 215 may fulfill this role to enable the cloud server to pass through a firewall without security).

5. Smart base station 215 may request that the cloud server pick up auto status data at certain time frames or the data transmit buffer is full.

Auto scheduling/status may be accomplished in different ways, including when the system detects that a device has not received data, a normal schedule is adjusted by a number of seconds to avoid conflicts in the future. This is a dynamic rescheduling and can occur for several reasons such as due to communication conflicts. Another auto scheduling event happens when a primary hub device fails. At that point, the schedules for all devices originally connected to that primary device need to find a secondary and tertiary device for communications. When that happens, each time a new device contacts its backup hub device, the system automatically incorporates that new device into its schedule and adjusts the schedules of all other devices connected to it to allow for correct windows for alarms. The scheduled communications may be continuously adjusted, based upon missed data or pairing with a new hub for example, such that identified time windows may always be provided that allow for alarms, critical communications, or other information exchanges within in the system.

Figure 3:
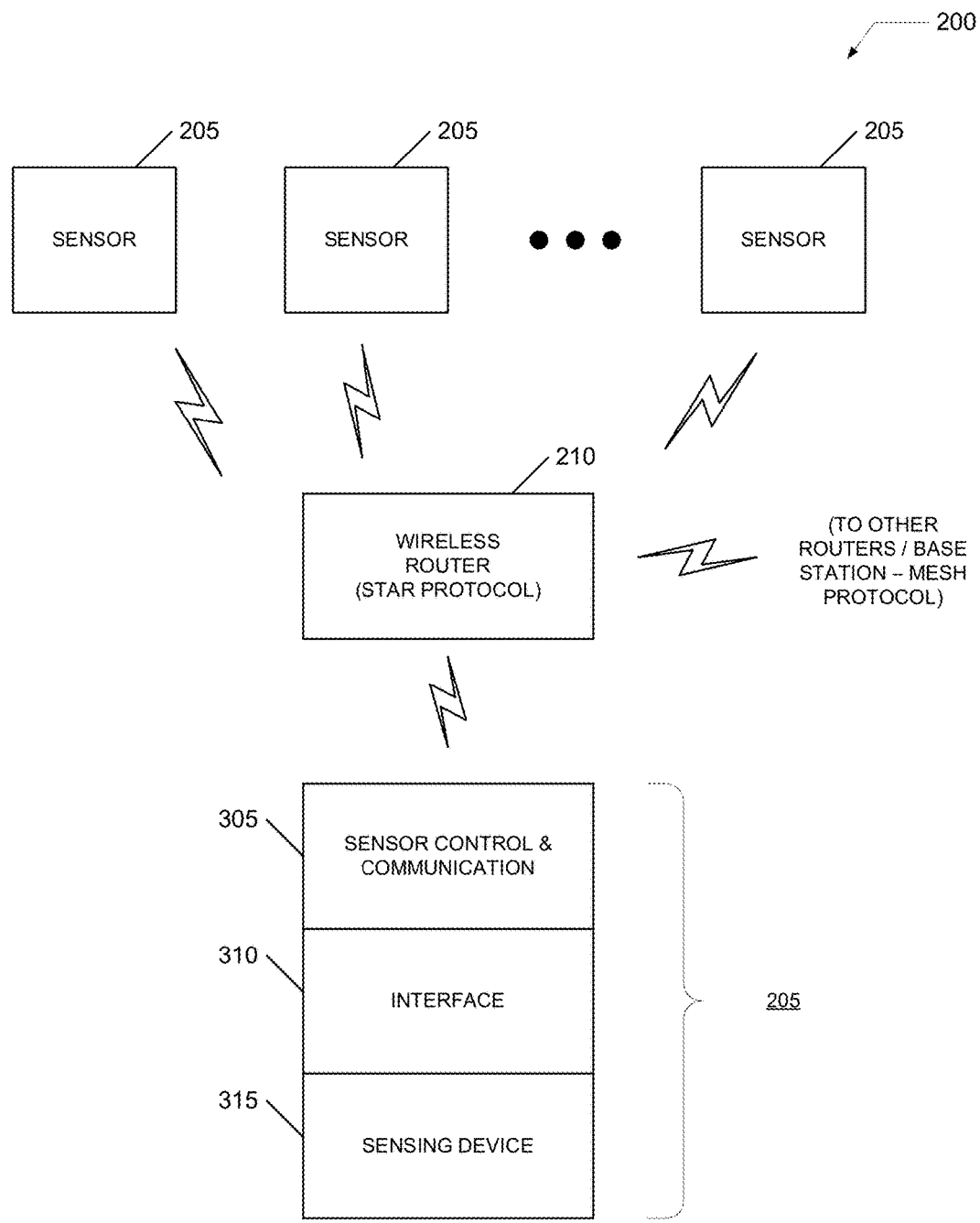
FIG. 3 illustrates a star node of the hybrid communications architecture illustrated in FIG. 2.

FIG. 3 illustrates details of an implementation of system 200 including a plurality of nodes 205 and hubs/routers 210. As illustrated, each node 205 includes a node controller 305 (with battery power), an interface 310, and a sensor or controller 315. Node controller 305 implements a wireless STAR protocol communications with an identified router 210 (or pre-identified set of routers 210 for enabling backup). Node controller 305 operates as directed which may include pre-scheduled routine communication with router 210 allowing for open time windows for alarms and critical messaging, such as uninterrupted communications from sensor 315 detecting some event or implementing a desired control.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A hybrid sensor communications architecture for a multilevel building including a set of floors with a first floor disposed over a second floor, comprising:
    a plurality of sets of sensor nodes, a set of sensor nodes distributed on each floor of the set of floors including a first set of sensor nodes on a first floor and a second set of sensor nodes on a second floor, wherein each said sensor node includes a particular sensor and a particular sensor scheduler coupled to said particular sensor, each said particular sensor scheduler including a sensor operation schedule configured to selectively enable and disable a wireless transmission of said coupled sensor responsive to said sensor operation schedule; and
    a set of wireless repeaters distributed on different floors of the set of floors, said set of wireless repeaters including a set of primary wireless repeaters with a first primary wireless repeater on the first floor and a second primary wireless repeater on the second floor, each said primary wireless repeater associated with a set of sensor nodes on its floor with said first primary wireless repeater associated with said first set of sensor nodes and said second primary wireless repeater associated with said second set of sensor nodes and each said wireless repeater including a STAR communications protocol communicating wirelessly with each said sensor node of its associated set of sensor nodes, wherein each said wireless repeater further includes a mesh communications protocol communicating wirelessly with each wireless repeater of said set of wireless repeaters,
    wherein said sensor operation schedule defines, for each said sensor, a scheduled communication time slot, wherein each said sensor is configured in a sleep mode until said scheduled communication time slot, wherein each said sensor is configured to wake when a current time matches said scheduled communication time slot and communicate a wake communication exchange with said associated wireless repeater using said STAR communications protocol, with said wake communications exchange including a burst transmission from said sensor to said associated wireless repeater and a responsive confirmation message from said associated wireless repeater to said sensor, with said responsive confirmation including a future scheduled communication time slot, and wherein said sensor returns to said sleep mode and said sensor configures said scheduled communications time slot using said future scheduled communications time slot.

2. The hybrid sensor communications architecture of claim 1, wherein said STAR communications protocol is configured for operation in a 900 MHz region at 1 Watt power.

3. The hybrid sensor communications architecture of claim 1, further comprising a base station including said mesh communications protocol in communication with said set of wireless repeaters, said base station transmitting said sensor operation schedule to said plurality of sets of sensor nodes.

4. The hybrid sensor communications architecture of claim 3 wherein said sensor operation schedule includes a dynamic sequential schedule for each said set of sensor nodes communicating with each said wireless repeater with said dynamic sequential schedule setting a 50% open communications period for each said set of sensor nodes.

5. The hybrid sensor communications architecture of claim 1 wherein said set of wireless repeaters includes a set of backup wireless repeaters coupled to said plurality of sets of wireless nodes with each said set of wireless sensor nodes further associated with a particular backup wireless repeater from said of backup wireless repeaters in addition to its associated primary wireless repeater, wherein said set of backup wireless repeaters includes a first backup wireless repeater on said first floor and a second backup wireless repeater on said second floor, wherein said first backup wireless repeater is associated with said first set of sensor nodes, wherein said second backup wireless repeater is associated with said second set of sensor nodes, wherein each said sensor communicates with its said associated backup wireless repeater whenever its said associated primary wireless repeater is unavailable for communications.

6. The hybrid sensor communications architecture of claim 2 wherein said set of wireless repeaters includes a set of backup wireless repeaters coupled to said plurality of sets of wireless nodes with each said set of wireless sensor nodes further associated with a particular backup wireless repeater from said of backup wireless repeaters in addition to its associated primary wireless repeater, wherein said set of backup wireless repeaters includes a first backup wireless repeater on said first floor and a second backup wireless repeater on said second floor, wherein said first backup wireless repeater is associated with said first set of sensor nodes, wherein said second backup wireless repeater is associated with said second set of sensor nodes, wherein each said sensor communicates with its said associated backup wireless repeater whenever its said associated primary wireless repeater is unavailable for communications.

7. The hybrid sensor communications architecture of claim 3 wherein said set of wireless repeaters includes a set of backup wireless repeaters coupled to said plurality of sets of wireless nodes with each said set of wireless sensor nodes further associated with a particular backup wireless repeater from said of backup wireless repeaters in addition to its associated primary wireless repeater, wherein said set of backup wireless repeaters includes a first backup wireless repeater on said first floor and a second backup wireless repeater on said second floor, wherein said first backup wireless repeater is associated with said first set of sensor nodes, wherein said second backup wireless repeater is associated with said second set of sensor nodes, wherein each said sensor communicates with its said associated backup wireless repeater whenever its said associated primary wireless repeater is unavailable for communications.

8. The hybrid sensor communications architecture of claim 4 wherein said set of wireless repeaters includes a set of backup wireless repeaters coupled to said plurality of sets of wireless nodes with each said set of wireless sensor nodes further associated with a particular backup wireless repeater from said of backup wireless repeaters in addition to its associated primary wireless repeater, wherein said set of backup wireless repeaters includes a first backup wireless repeater on said first floor and a second backup wireless repeater on said second floor, wherein said first backup wireless repeater is associated with said first set of sensor nodes, wherein said second backup wireless repeater is associated with said second set of sensor nodes, wherein each said sensor communicates with its said associated backup wireless repeater whenever its said associated primary wireless repeater is unavailable for communications.

9. A sensor architecture for a multi-region building including a plurality of sensor nodes distributed within the multi-region building, comprising:
a first sensor node subset of the plurality of sensor nodes distributed in a first region of the first multi-region building;
a second sensor node subset of the plurality of sensor nodes distributed in a second region of the multi-region building, said second region being separate and distinct from said first region; and
a first wireless repeater and a second wireless repeater wirelessly communicating with the plurality of sensor nodes using a wireless STAR communications protocol, with each said repeater including a primary communications mode, wherein said primary communications mode for said first wireless repeater communicates wirelessly with said first sensor node subset without communication with said second sensor node subset, and wherein said primary communications mode for said second wireless repeater communicates wirelessly with said second sensor node subset without communication with said first sensor node subset, wherein said repeaters each include a wireless mesh communication protocol communicating with other wireless repeaters,
wherein said first wireless repeater includes a secondary communications mode active when a set of sensor nodes of said second sensor node subset are unable to wirelessly communicate with said second wireless repeater in said primary communications mode of said second wireless repeater, said secondary communications mode of said first wireless repeater using said wireless STAR communication protocol to communicate wirelessly with said set of sensor nodes of said second sensor node subset.

10. The sensor architecture of claim 9, wherein said STAR communications protocol is configured for operation in a 900 MHz region at 1 Watt power, wherein the multi-region building includes a multi-floor building with each said region including a separate floor of said multi-floor building.

11. The sensor architecture of claim 9 wherein each said sensor node includes a particular sensor and a particular sensor scheduler coupled to said particular sensor with each said sensor scheduler including a sensor operation schedule configured to selectively enable and disable a wireless transmission of said coupled sensor responsive to said sensor operation schedule.

12. The sensor architecture of claim 11 further comprising:
a base station including said mesh communications protocol in communications with said set of wireless repeaters, said base station transmitting said sensor operation schedule to said plurality of sets of sensor nodes.

13. The sensor architecture of claim 12 wherein said base station dynamically updates said sensor operation schedule adjusting said enablement and said disablement of said wireless transmissions.

14. The sensor architecture of claim 12 wherein each said sensor node and each said wireless repeater include an internal clock and wherein said wireless repeaters each include an auto-time scheduler configured to resynchronize time with the plurality of sensor nodes maintaining said sensor operation schedule.

15. A sensor architecture for a multi-region building including a plurality of sensor nodes distributed within the multi-region building, comprising:
a first sensor node subset of the plurality of sensor nodes distributed in a first region of the first multi-region building;

a second sensor node subset of the plurality of sensor nodes distributed in a second region of the multi-region building, said second region being separate and distinct from said first region;

a first wireless repeater and a second wireless repeater wirelessly communicating with the plurality of sensor nodes using a wireless STAR communications protocol, with each said repeater including a primary communications mode, wherein said primary communications mode for said first wireless repeater communicates wirelessly with said first sensor node subset without communication with said second sensor node subset, and wherein said primary communications mode for said second wireless repeater communicates wirelessly with said second sensor node subset without communication with said first sensor node subset, wherein said repeaters each include a wireless mesh communication protocol communicating with other wireless repeaters;

a third sensor node subset of the plurality of sensor nodes distributed in a third region of the multi-region building, said third region being separate and distinct from said first region and said second region; and a third wireless repeater wirelessly communicating with the plurality of sensor nodes using a wireless STAR communications protocol, with said third wireless repeater including a primary communications mode, wherein said primary communications mode for said third wireless repeater communicates wirelessly with said third sensor node subset without communication with said first sensor node subset and said second sensor node subset, wherein said first wireless repeater and said second wireless repeater each includes a secondary communications mode with said secondary communications modes being active when a first set of sensor nodes of said third sensor node subset are unable to wirelessly communicate with said third wireless repeater in said primary communications mode of said third wireless repeater, said secondary communications modes using said wireless STAR communication protocol to communicate wirelessly with said first set of sensor nodes of said third sensor node subset, and wherein said first wireless repeater includes a tertiary communications mode with said tertiary communications mode of said first wireless repeater active when a second set of sensor nodes of said third sensor node subset are unable to wirelessly communicate with either of said second wireless repeater or said third wireless repeater in any of said communications modes of said second wireless repeater and said third wireless repeater, said tertiary communications mode of said first wireless repeater using said wireless STAR communication protocol to communicate wirelessly with said second set of sensor nodes of said third sensor node subset.

16. The sensor architecture of claim 15, wherein said STAR communications protocol is configured for operation in a 900 MHz region at 1 Watt power, wherein the multi-region building includes a multi-floor building with each said region including a separate floor of said multi-floor building.

* * * * *